United States Patent
Rankin

(10) Patent No.: US 9,350,663 B2
(45) Date of Patent: May 24, 2016

(54) ENHANCED LARGE DATA TRANSMISSIONS AND CATASTROPHIC CONGESTION AVOIDANCE OVER TCP/IP NETWORKS

(71) Applicant: John Rankin, Circleville, OH (US)

(72) Inventor: John Rankin, Circleville, OH (US)

(73) Assignee: Connectivity Systems Incorporated, Williamsport, OH (US)

( * ) Notice: Subject to any disclaimer, the term of this patent is extended or adjusted under 35 U.S.C. 154(b) by 64 days.

(21) Appl. No.: 14/491,843

(22) Filed: Sep. 19, 2014

(65) Prior Publication Data

US 2015/0078160 A1    Mar. 19, 2015

Related U.S. Application Data

(60) Provisional application No. 61/880,070, filed on Sep. 19, 2013.

(51) Int. Cl.
*H04L 12/28* (2006.01)
*H04L 12/801* (2013.01)

(52) U.S. Cl.
CPC .............. *H04L 47/12* (2013.01); *H04L 47/193* (2013.01)

(58) Field of Classification Search
None
See application file for complete search history.

(56) References Cited

U.S. PATENT DOCUMENTS

| | | | |
|---|---|---|---|
| 6,757,248 B1 | 6/2004 | Li et al. | |
| 8,374,091 B2 | 2/2013 | Chiang | |
| 8,397,151 B2 | 3/2013 | Salgado et al. | |
| 2001/0017844 A1* | 8/2001 | Mangin | H04L 1/1671 370/231 |
| 2002/0041592 A1* | 4/2002 | Van Der Zee | H04W 72/1242 370/389 |
| 2002/0054570 A1* | 5/2002 | Takeda | H04L 1/0023 370/252 |
| 2012/0300648 A1 | 11/2012 | Yang | |
| 2012/0307678 A1 | 12/2012 | Gerber et al. | |
| 2013/0028121 A1 | 1/2013 | Rajapakse | |
| 2013/0058231 A1 | 3/2013 | Paddon et al. | |

* cited by examiner

*Primary Examiner* — Bob Phunkulh
(74) *Attorney, Agent, or Firm* — Standley Law Group LLP

(57) ABSTRACT

A system and method of reducing network congestion whereby significant improvement can be gained by the elimination of catastrophic network congestion failure within a TCP/IP network. Exemplary embodiments are implemented by an improved process for dealing with the retransmission of TCP window data. By reducing packet loss to a grid map and retransmitting only the lost pieces rather than the entire window, congestion can be eliminated. In a traditional TCP implementation, loss of packets within a specified window of data can cause the entire window of data to be retransmitted. This system and method improves this process by allowing only lost packets to be retransmitted and not properly received data that is merely part of a larger grouping that also contained lost data.

13 Claims, 3 Drawing Sheets

ENHANCED LARGE DATA TRANSMISSIONS AND CATASTROPHIC CONGESTION AVOIDANCE OVER TCP/IP NETWORKS

CROSS-REFERENCE TO RELATED APPLICATIONS

This application claims priority to U.S. Provisional Application No. 61/880,070 filed 19 Sep. 2013, the content of which is hereby incorporated by reference as if fully recited herein.

TECHNICAL FIELD

Exemplary embodiments of the present invention relate generally to network communications and more specifically to systems and methods of avoiding catastrophic congestion failure and resource waste when transmitting large data sets over TCP/IP networks.

BACKGROUND OF THE INVENTION

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate by using the TCP/IP standard, or format, to transfer or share data. TCP/IP rules are established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use and manage the Internet with the goal of improving its operations and efficiencies. These documents include protocol standards, best current practices and information updates of various kinds, and are commonly referred to as Request for Comments (RFC).

TCP can be used to establish a bi-directional connection between two clients wherein activity begins with a request for information made by one client to another client. A "client" is any program or application that initiates requests for or sends information from one remote location to another. As used herein, the term "client" may refer to such applications including, but not limited to, web browsers, web servers, file transfer protocol (FTP) programs, electronic mail programs, line printer (LPR) programs also known as print emulators, mobile phone apps, and telnet programs also known as terminal emulators, all of which operate conceptually in an application layer.

The TCP protocol is typically implemented as a "daemon" that is part of a TCP/IP stack of protocol layers. A daemon—also often referred to interchangeably as a server or service—is generally a software component of a device that runs a background process. As used herein in relation to the operation of the TCP protocol, the term "daemon" is used to refer to a component of a networked device that sends (source daemon) or receives (destination daemon), and processes communications between remote clients according to the TCP standard.

A host is a device or system that runs or executes TCP/IP daemons. As used herein, the term "host" refers to any such device or system including, but not limited to, a server platform, a personal computer (PC), and any other type of computer or peripheral device that implements and runs TCP software. Generally, a host physically connects and links clients and daemons to TCP/IP networks, thereby enabling communication between clients.

TCP software accepts requests and data streams directly from clients and other daemons, sequentially numbering the bytes, or octets, in the stream during the time the connection is active. When required, it breaks the data stream into smaller pieces called segments (sometimes referred to as datagrams or packets generally) for transmission to a requesting client. The protocol calls for the use of checksums, sequence numbers, timestamps, time-out counters and retransmission algorithms to ensure reliable data transmission. [RFC 793, 1981]

The IP layer actually performs the communication function between two networked hosts. The IP software receives data segments from the TCP layer, ensures that the segment is sized properly to meet the requirements of the transmission path and physical adapters (such as Ethernets and CTCs). IP changes the segment size if necessary by breaking it down into smaller IP datagrams, and transmits the data to the physical network interface or layer of the host. [RFC 791, 1981]

IP (and other similar Internet layer protocols) software is not designed for reliability. TCP expects IP to transmit the data immediately, so IP sends the data with no further checks. If actual transmission is delayed or incomplete, the data is discarded. Successfully transmitted data is handed off to the receiving host TCP software, however, which uses its verification and acknowledgement systems to ensure that the data requested is received by the requesting client. If the sending host TCP software does not receive acknowledgement of a complete transmission, it retransmits the data. One consequence of this system is that retransmissions increase when a physical communication path becomes saturated or otherwise unavailable, which in turn causes CPU and network capacity consumption to increase.

The large system effect occurs in processing systems that are designed to handle a specific set of conditions of finite size and complexity. When presented with conditions larger and more complex than expected, those systems no longer operate efficiently—or at all. To illustrate this effect, imagine a small town with one main cross street at an intersection having a stop light that is timed to change on one minute intervals to allow traffic to flow efficiently based on the size of the expected traffic volume. Under normal operating conditions, the design works effectively, as the number of cars entering and leaving the city from any given direction is a volume that fits within the design parameters. However, if the volume of traffic using the cross streets increases beyond the amount that can be handled during a one minute traffic stop, congestion will occur. The congestion will continue to exacerbate if the excess traffic volume does not decrease below the maximum number of cars that can pass through the intersection during the one minute window. Therefore, if new cars entering the town continue to exceed the expected, designed capacity, the traffic system will ultimately fail. The failure of a system in this manner is due to large system effects.

This type of systematic problem can be referred to as a non-linear system moving from ordered operation into chaos. In the previous example, the system moved from an ordered operation into chaos, because the growth of traffic is non-linear and the progression of the system operation is repetitive and does not correct for the change in non-linear conditions. While one would hope that a system could be designed to handle a multitude of changing and expanding criteria, the reality is far less certain because systems can only truly be designed to handle what can be reasonably envisioned.

The chaotic operations produced by the large system effect do not often occur in a smooth or increasing movement of order to chaos. Chaotic order tends to occur as catastrophic breakpoints in system behavior. Even slow changes in a system's control parameters can result in a sudden shift to catastrophe. This type of phenomenon occurs in the water-ice transition at sea level pressure: as temperature decreases below the freezing temperature, water displays a transition to the solid state. Systems that may potentially experience such large system effects may exhibit sudden catastrophic behavior at intervals and without an observable smooth transition.

Large system effects may arise in computer networking systems, protocols and implementations when algorithms that are efficient for small configurations or low transaction rates but that are inefficient for large configurations or high transactions rates are employed. In the context of TCP/IP and network communications, TCP standards control the transmission rate of data streams between connected clients. As networked host processing capabilities and storage become ever more plentiful, the amount of data that clients request and transmit likewise increases. Many of today's clients require increasingly large data transfer rates that amplify tendencies toward network congestion—especially when considering the rapidly growing number of networked "smart" devices and the pervasiveness of the PC.

Current TCP implementations employ flow control mechanisms to ensure that the sending daemon does not transmit data faster than the receiving daemon can process the incoming stream. The standard defines an advertized window size included in each acknowledgement that indicates to the sending daemon the amount of data the receiving daemon is willing to accept. A TCP "advertized window" is a term used to describe in part a logical window used by a receiving daemon to limit the number of outstanding TCP segments in transmission at any given time, and represents the number of bytes that the remote sending client is authorized to send over an IP connection using the TCP protocol. The advertized window allows a receiving daemon to specify its buffer size every time it sends a segment/acknowledgement to the sending daemon. The advertized window and highest acknowledged sequence number together yield the window end point—i.e., the sequence number of the byte following the last position in the receiving daemon's window.

One of the rules is that this end point should never move backward (a shrinking window). Under normal circumstances, as data is received, it is acknowledged and the advertized window is further extended. If the data arrives faster than it can be accommodated, it still must be acknowledged in a timely fashion, but the end point of the window is not advanced. Eventually, all of the data within the advertized window is transmitted, the end point is reached and the window is closed. Once the window is closed, no more data will be accepted until it is reopened. One of the rules is that when a window is reopened, it must be fully reopened to its maximum size.

TCP sending daemons also utilize a logical window referred to as a "retransmission window" that covers the bytes in the data stream that have been authorized for transmission (including sent and unsent bytes). TCP retransmission window sizes operating under normal circumstances are set to and defined by the advertized window size. To increase overall transmission speed, TCP buffers well beyond the window size and maintains the advertized window at its maximum value with every acknowledgement. While this encourages an increase in data transmission, it also exposes the TCP protocol to the large system effect.

While the flow rate of the data streams being transmitted has increased, the size requirements of the actual packets of information transmitted on the IP network, for instance the common physical Ethernet hardware layer, has not. The TCP Maximum Segment Size (MSS) option preferably is used to set the segment size to be no greater than the smallest Maximum Transmission Unit (MTU) of the network. Therefore, as larger and larger window sizes permit the transmission of larger sequence ranges of the data stream, the specific window of data transmitted must be broken into a greater number of segments no larger than the established MSS. TCP is a positive cumulative acknowledgement protocol, and therefore, the greater number of segments being transmitted in a large window generates even more network traffic by increasing the number of potentially outstanding acknowledgements if acknowledgements are sent for each segment received.

Furthermore, adjustments to a TCP implementation made to avoid over-transmission of acknowledgements mean that if congestion within the network causes the loss of a single segment of data, the entire window must often be retransmitted to repair the damage to the overall stream. [RFC 813] This retransmission causes a non-linear expansion of the traffic within the network and therefore results in additional packet loss and subsequently additional retransmissions. This catastrophic behavior is caused because TCP requires more data to be retransmitted than is ultimately required, causing congestion collapse. This large system effect is not corrected by the additional enhancements to IP that have been presented with IP version 6.

Attempts have been made to correct such potential congestion failures in a TCP/IP network. While the TCP specification itself does not provide for specific congestion control mechanisms, implementations may use TCP functionality to provide such mechanisms. For example, many TCP implementations include the use of adaptive retransmission algorithms to vary the time period after which the sending daemons will retransmit the unacknowledged segments in its retransmission window.

In addition to delaying retransmissions when network latency begins to increase due to congestion, later TCP standards included several methods of congestion avoidance, including slow-start additive recovery and multiplicative decrease congestion avoidance algorithms. [RFC 2201] These algorithms are used by a sending daemon to track a congestion window size that, if smaller than the receiving daemon's advertized window size, is used to limit the sequence range being sent. Implementing these and other similar algorithms, however, can significantly reduce data transfer rates by unnecessarily restricting the retransmission window as they are conservative congestion estimating algorithms.

Other optional TCP functions have been introduced to decrease the probability of duplicate data retransmission such as the selective acknowledgement option. The selective acknowledgement option allows a receiving daemon to specify several blocks of discontinuous data that have been received with sequence numbers higher than the sequence numbers in one or more segments that have not been received. The sending daemon may then construct a retransmission that does not include the data in the blocks received out of order. [RFC 2018] While useful, the selective acknowledgement option is limited by the fact that a selective acknowledgement must acknowledge discontinuous data blocks by bounding 32-bit sequence numbers, in practice limiting the option to three or four discontinuous blocks of data. Therefore, beyond the first three or four lost segments in a window transmission, the retransmitting data will be duplicative.

Thus, there exists a need in the prior art for improved network transmission control rules that do not unnecessarily decrease data transmission rates, in order to avoid large system effects.

BRIEF SUMMARY OF THE INVENTION

The TCP protocol acknowledges receipt of data in terms of a specific sequence number within a continual stream of sequentially numbered data segments being transmitted, in a cumulative nature. Data is transmitted in a large sequence range known as a window; the actual data passing through the network is composed of much smaller pieces of data because these pieces must fit within Ethernet and other such network hardware interface requirements. When a single piece of data, perhaps only 536 characters in length, is lost the acknowledgement mechanism within TCP can require that the entire sequence of data be retransmitted. This retransmission problem can be eliminated by enhancing this data management process in the following manner:

Before beginning the transmission process, TCP must determine the size of the packet transmission pieces (data piece or segments). It must be able to calculate how many segments a window of data will be broken into for actual transmission.

A bitmap representing all of the data segments within the window must be constructed and added to the TCP header for transmission. Each bit within the bit map corresponds to a specific data segment within the overall window of data by storing a reference to its position in the window in a single bit in the bitmap.

The receiving daemon uses this same bitmap to acknowledge the receipt of each segment within the window of data by segment position rather than by sequence number. The acknowledgement transmission that normally would trigger a retransmission also contains a bitmap added to the TCP header. This acknowledgement transmission clearly identifies which data segments were or were not received.

The sending daemon, using the acknowledgement bitmap as a guide, can construct a retransmission that contains the missing data pieces. The retransmission clearly identifies which data segments are present within the transmission because the bitmap will only have bits turned on for the data segments that are being sent.

This methodology will allow TCP to significantly reduce catastrophic congestion exacerbation, because only data lost in transmission will be retransmitted. By the addition of an acknowledgement bit map to the TCP header, TCP will be capable of regulating data flow down to a much granular level rather than only working at a large and gross scale.

An object of the present invention is to provide these advantages in a method of congestion avoidance in a packet switched network. The method comprises the steps of: receiving in a transmit buffer of a sending daemon on a first remote host a data stream to be transmitted over the network to a second remote host, determining a retransmission window defined by a first unacknowledged sequence number in the data stream and a size, determining a segment size that is smaller than the retransmission window size, dividing the data stream in the retransmission window into a plurality of segments for transmission to the second remote host, constructing a transmission bitmap comprising an active bit for each segment in the plurality of segments, appending a header to each segment in the plurality of segments wherein the header includes the transmission bitmap, and transmitting each segment in the plurality of segments to the second remote host. In some embodiments, the step of determining a segment size that is smaller than the retransmission window size includes the step of determining a segment size by which the retransmission window size is divisible.

Some embodiments of the invention include the steps of receiving an acknowledgement bitmap wherein each bit in the acknowledgement bitmap is inactive, determining that all segments in the retransmission window were acknowledged, and sliding the retransmission window to the next contiguous unacknowledged sequence number in the data stream. Some of those embodiments further include the steps of dividing the data stream in the retransmission window into a plurality of segments for transmission to the second remote host, constructing a second transmission bitmap comprising an active bit for each segment in the plurality of segments, appending a header to each segment in the plurality of segments wherein the header includes the second transmission bitmap, and transmitting each segment in the plurality of segments to the second remote host.

Yet other embodiments of the invention are provided that include the steps of receiving an acknowledgement bitmap comprising one or more active bits and retransmitting to the second remote host each segment in the plurality of segments corresponding to each bit in the one or more active bits of the acknowledgement bitmap. Some embodiments, after receiving an acknowledgement bitmap comprising one or more active bits, further include the steps of duplicating the acknowledgement bitmap as a retransmission bitmap, appending a retransmission header to each segment in the plurality of segments corresponding to the one or more active bits, wherein the retransmission header includes the retransmission bitmap, and retransmitting each segment in the plurality of segments to which a retransmission header was appended to the second remote host.

In some embodiments, the acknowledgement bitmaps constructed and used in the exemplary methods comprise an inactive bit corresponding to each segment in the transmission bitmap not received by the second remote host, and an active bit corresponding to each segment in the transmission bitmap received by the second remote host.

Additional exemplary embodiments include methods of congestion avoidance in a packet switched network. The steps of the method include: sending an acknowledgement from a receiving daemon of a first remote host to a second remote host wherein the acknowledgement has a next expected sequence number and an advertised window size that together define a plurality of segment positions in an advertised window, receiving in a receive buffer of the receiving daemon a plurality of segments of a data stream wherein the number of segments in the plurality of segments is less than the number of segment positions in the plurality of segment positions of the advertised window, sorting each segment in the plurality of segments into a sequentially corresponding segment position in the plurality of segment positions, constructing an acknowledgement bitmap having a plurality of ordered binary bits each having a default value and a received value and further corresponding to a segment position in the plurality of segment positions, setting each bit to a received value for each segment position corresponding to a segment in the plurality of segments, appending the acknowledgement bitmap to a retransmission acknowledgement, and transmitting the retransmission acknowledgement to the second remote host.

These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Figure 1:
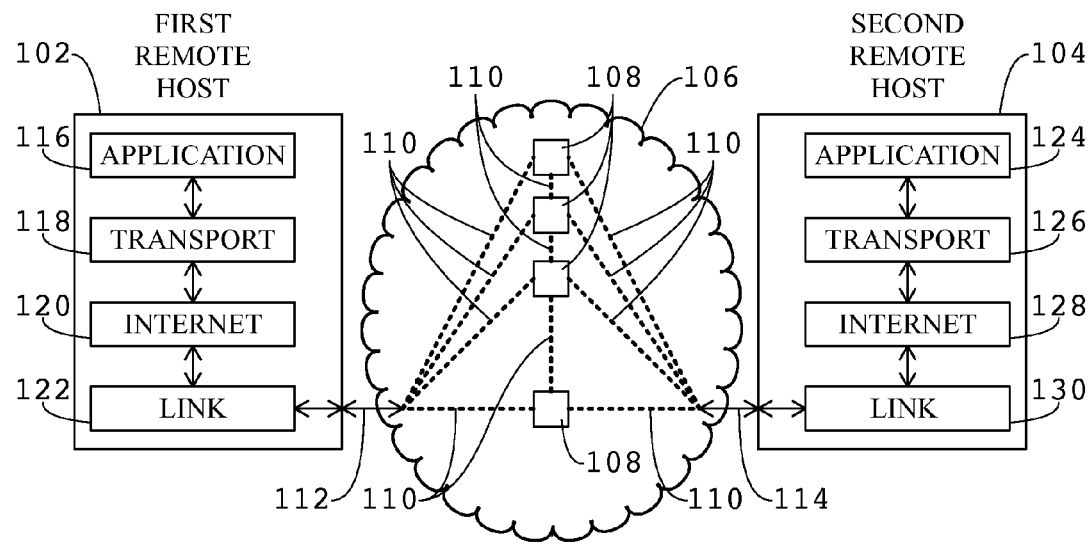
FIG. 1 is a schematic view depicting two remote hosts interacting to carry out the steps of an exemplary embodiment of the invention.

Exemplary embodiments of the invention are directed to a system for and method of handling packet loss during data transmission between two remote hosts that avoids network congestion escalation without unnecessarily decreasing the rate of data transfer, thereby increasing the overall speed and efficiency of the data transmission during a connection. An exemplary embodiment of the invention is preferably implemented within the transport layer of networked hosts. FIG. 1 depicts a typical configuration of first 102 and second 104 remote hosts in communication with one another via a packet switched network 106 made up of one or more network devices 108. Those skilled in the art will appreciate that the physical makeup, routing protocols and the like may take on a variety of forms and combinations without departing from the scope of the invention disclosed herein, and that any particular network components described herein should not be seen as limiting, but rather are provided for exemplary purposes only.

For example, in the representation of physical hardware and logical layers illustrated in connection with FIG. 1, the network 106 may be embodied in a local area network comprised of one or more network devices 108 such as WiFi receivers and repeaters, routers and switches, or as multiple public or private networks in turn networked together. In some embodiments, the network devices 108 and remote hosts 102 and 104 may utilize Ethernet hardware, WiFi/radio, and other such known or later-developed physical data transmission specifications to establish communication routes 110 on which to move data between hosts. The same is generally true as to the variability in the connections 112 and 114 between the network 106 and the first 102 and second 104 hosts, respectively, as the present invention is directed primarily to the transmission layer in a set of communication protocols. Therefore, while important to the overall data transmission effort, the specific embodiments of the physical transmission components should not be taken as limiting in scope.

Figure 2:
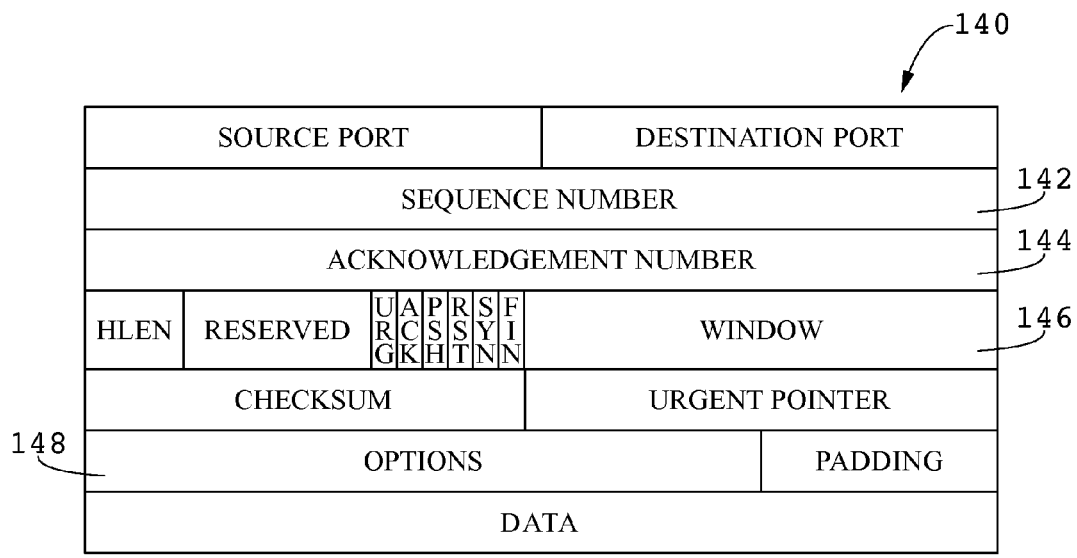
FIG. 2 is a representation of an exemplary TCP header.

A common abstraction of a suite of communication protocols that may be implemented on remote hosts, such as 102 and 104, are also depicted generally in FIG. 1. For example, a host may include an application layer 116 and 124, a transport layer 118 and 126, an internet layer 120 and 128, and a link layer 122 and 130. In the widely-implemented TCP/IP suite and variants thereof, a header is constructed and parsed by the transport layer daemon of a host in order to facilitate orderly data transmission between itself and other networked hosts. A typical TCP header 140 is shown in FIG. 2. For example, the sequence number field 142 is used by a sending daemon to indicate an initial or accumulated sequence number of the first data byte for a particular segment being transmitted, the acknowledgement number field 144 is used by a receiving daemon to indicate the next expected sequence number it is expecting, and the window field 146 is used to define the current size of the receive window of the receiving daemon. As further described in detail below, the bitmap used for data retransmission due to lost or delayed packets is, in one embodiment, included in the options field 148.

Figure 3:
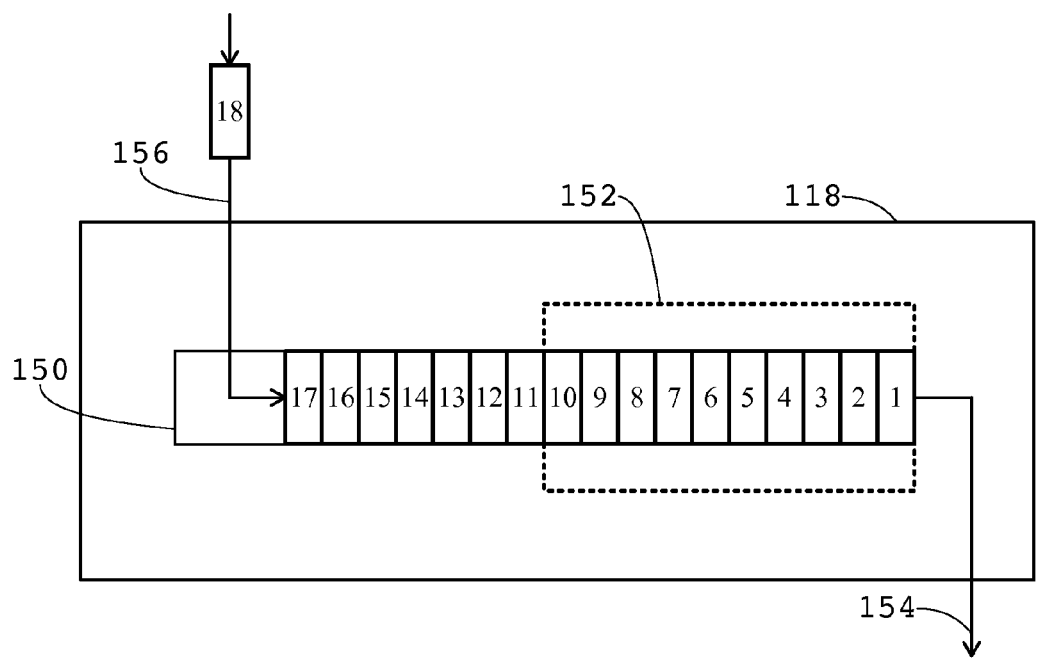
FIG. 3 illustrates the exemplary operation of a sending daemon according to the invention.

Turning to FIG. 3, a representation of a transmission buffer 150 in the transport layer of a sending daemon in a remote host is shown (e.g., in the transport layer 118 of the first remote host 102 depicted in FIG. 1). References will also be made herein to corresponding elements of an exemplary system of networked hosts as depicted in connection with FIG. 1 for illustrative purposes. The dotted outline represents the position of a retransmission window 152, which determines how much data will be sent to the next communication layer (e.g., to the internet layer 120 via arrow 154) and ultimately to the transport layer 126 of a second remote host 104, before awaiting an acknowledgement by the receiving daemon of the second remote host. A data stream from the application layer 116, for instance, is received via arrow 156 into the buffer 150 of the sending daemon so as to maintain a buffered transmission data stream during an open session.

Under the conditions shown and in accordance with the present invention, a bitmap having 10 bits representing ten data segments in the window 152 is appended to the TCP header of each segment. For sake of brevity, these ten TCP data segments are shown having sequence numbers 1-10. In one exemplary embodiment of the bitmap, active bits are used to represent unacknowledged segments, and inactive bits are used to represent acknowledged segments. In another exemplary embodiment, inactive bits are used to represent unacknowledged segments, and active bits are used to represent acknowledged segments. The following disclosure will refer to exemplary embodiments making use of the former, but those skilled in the art will appreciate that either method may be utilized without departing from the scope of the invention, and that such binary bits may be said generally to have two values: on and off, active and inactive, default and received, and so on. Generally, the position-centric information carried in the bitmap, when combined with the position of the advertised window at the receiving daemon, permits precise acknowledgement of segments in the sending daemon's retransmission window. This feature is beneficial as the sending daemon may be adapted to retransmit only the specific segments unacknowledged by the receiving daemon, thereby reducing resource waste and further exacerbating network congestion.

Figure 4:
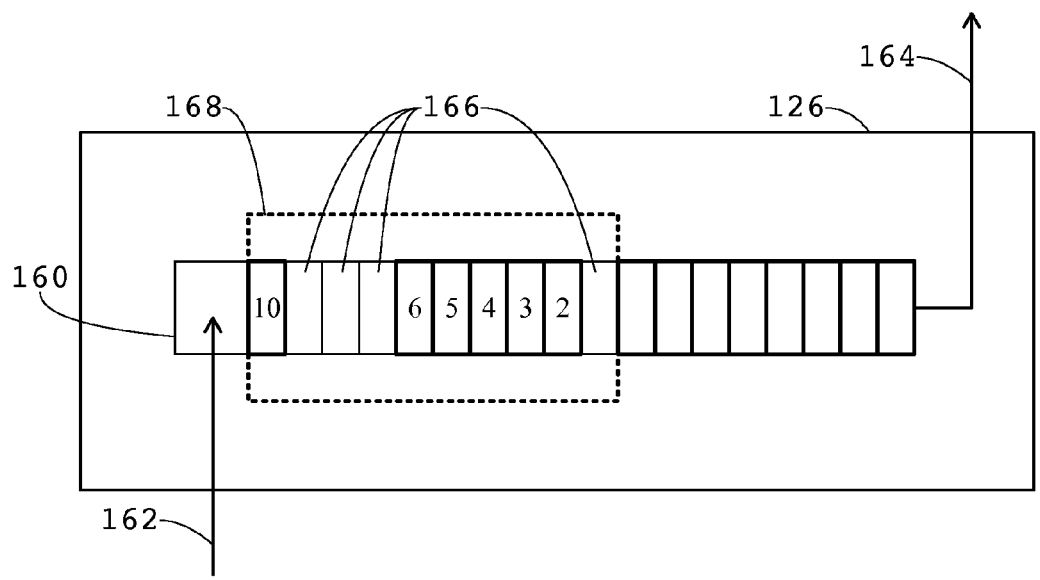
FIG. 4 illustrates the exemplary operation of a receiving daemon according to the invention in a first exemplary scenario.

FIG. 4 represents and exemplary condition of the receiving daemon of the transport layer 126 of the second remote host 104. Exemplary embodiments of the receiving daemon will generally include a receive buffer 160 that accepts data, via arrow 162, from the lower communication layer (e.g., from the internet layer 128) and transmits ordered data, via arrow 164, to the application layer. The unshaded segments 166 represent segments that have not been received within the advertised window 168 at the remote host 104. In this scenario, the receiving daemon has not received segments 1 and 7-9 sent by the sending daemon, and would thus send one or more acknowledgements with a bitmap having the first, seventh, eighth and ninth bits active, and the second, third, fourth, fifth, sixth and tenth bits inactive. The sending daemon will then retransmit the four segments in its retransmission window 152 corresponding to the inactive bits in the bitmap received (i.e., 1 and 7-9), and thus the segments that were not received by the receiving daemon. In some embodiments each retransmitted segment includes a bitmap mirroring the most recently received acknowledgement bitmap from the receiving daemon at the time of transmission.

Figure 5:
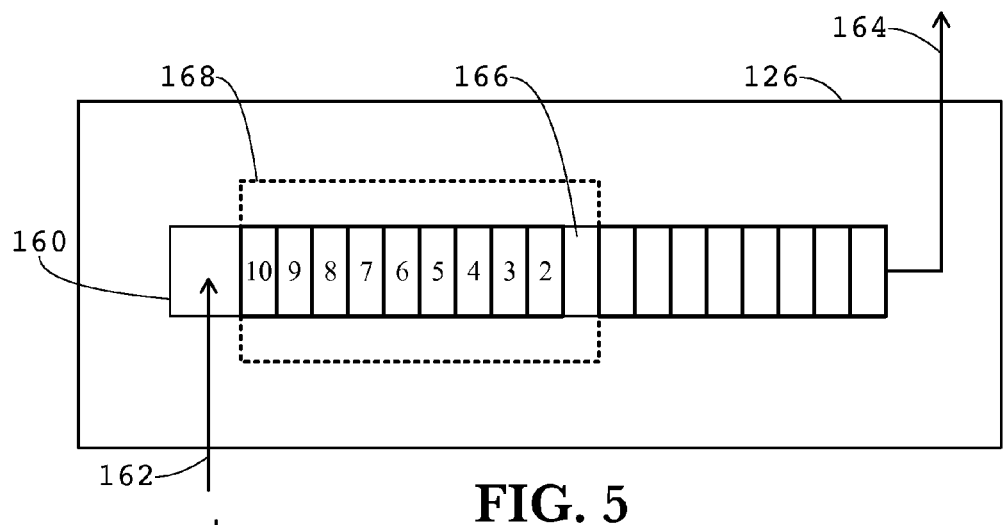
FIG. 5 illustrates the exemplary operation of a receiving daemon according to the invention in a second exemplary scenario.

In FIG. 5, a second exemplary condition is illustrated wherein the retransmission of the four missing or delayed segments has occurred as described, wherein the seventh, eighth and ninth segments 7-9 were received by the receiving daemon on the second attempt. The first segment was again lost. The receiving daemon sends an acknowledgement to the sending daemon with only the first bit active in the acknowledgement bitmap. The sending daemon then retransmits the first segment for the second time, wherein it may be received by the receiving daemon and acknowledged.

Figure 6:
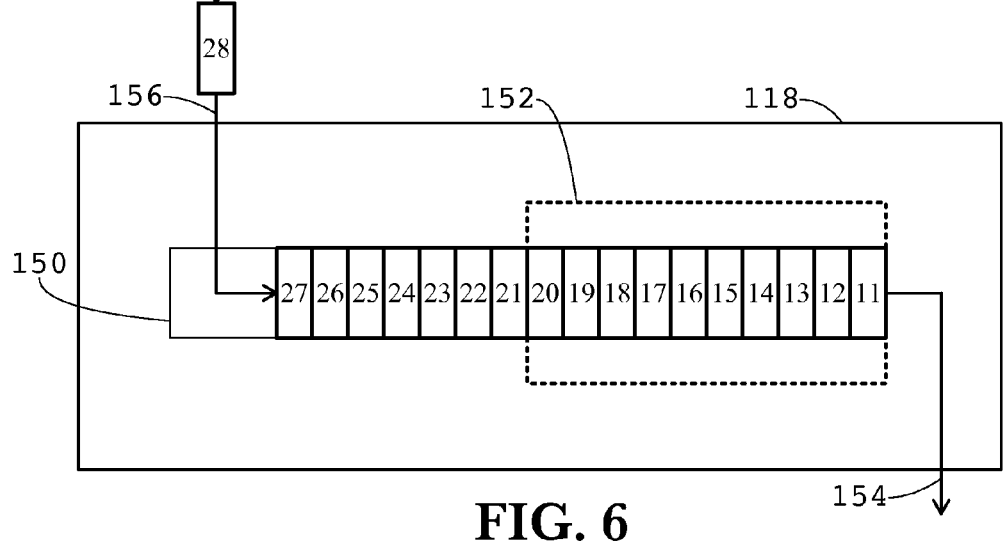
FIG. 6 illustrates the exemplary operation of a sending daemon according to the invention in a third exemplary scenario.
Figure 7:
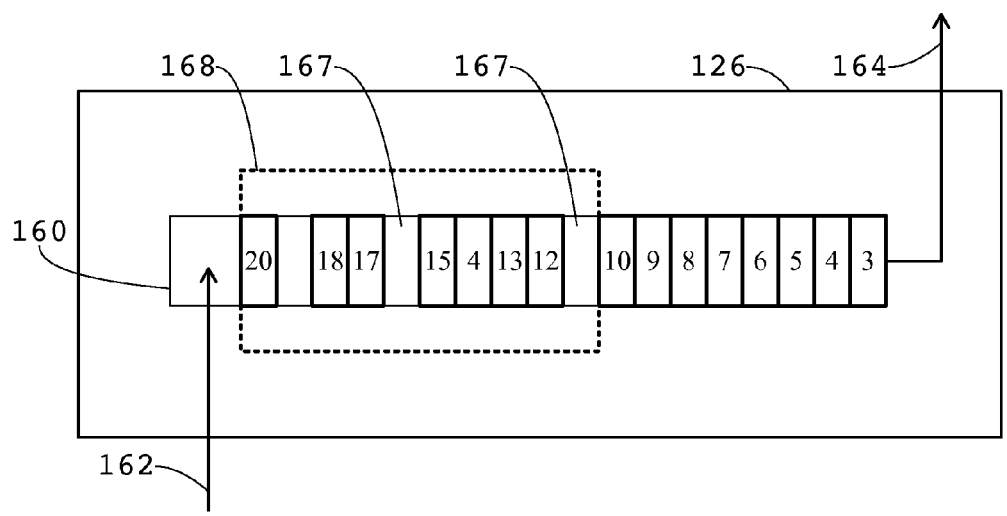
FIG. 7 illustrates the exemplary operation of a receiving daemon according to the invention.

Once all segment are acknowledged for a bitmap for a given window position, the sending daemon of the first remote host 102 slides its window 152 to encompass the portion of the data stream in the eleventh through the twentieth segments. This exemplary condition is illustrated in connection with FIG. 6. A new transmission bitmap having 10 bits is constructed and appended to the TCP header for those segments, whereafter they are transmitted to the receiving daemon of the second remote host 104. In FIG. 7, a later exemplary condition of the receiving daemon is illustrated wherein the eleventh, fourteenth and nineteenth bits have been lost or delayed, as depicted by empty segment positions 167. The receiving daemon constructs an acknowledgement bitmap with the first, fourth and ninth bits active, and includes the bitmap in its acknowledgement to the sending daemon, wherein the process is repeated.

Certain aspects of the present invention include process steps and instructions described herein in the form of a method. It should be noted that the process steps and instructions of the present invention could be embodied in software, firmware or hardware and the application of the invention to network-enabled hosts should not be limited thereby.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method of congestion avoidance in a packet switched network comprising the steps of:
   receiving, in a transmit buffer of a sending daemon of a first remote host, a data stream to be transmitted over the network to a second remote host;
   determining a retransmission window defined by a first unacknowledged sequence number in the data stream and a size;
   determining a segment size that is smaller than the retransmission window size;
   dividing the data stream in the retransmission window into a plurality of segments for transmission to the second remote host;
   constructing a transmission bitmap comprising an active bit for each segment in the plurality of segments;
   appending a header to each segment in the plurality of segments wherein the header includes the transmission bitmap; and
   transmitting each segment in the plurality of segments to the second remote host.

2. The method of claim 1, wherein the step of determining a segment size that is smaller than the retransmission window size further comprises determining a segment size by which the retransmission window size is divisible.

3. The method of claim 1, further comprising the steps of:
   receiving an acknowledgement bitmap wherein each bit in the acknowledgement bitmap is inactive;
   determining that all segments in the retransmission window were acknowledged; and
   sliding the retransmission window to the next contiguous unacknowledged sequence number in the data stream.

4. The method of claim 3, further comprising the steps of:
   dividing the data stream in the retransmission window into a plurality of segments for transmission to the second remote host;
   constructing a second transmission bitmap comprising an active bit for each segment in the plurality of segments;
   appending a header to each segment in the plurality of segments wherein the header includes the second transmission bitmap; and
   transmitting each segment in the plurality of segments to the second remote host.

5. The method of claim 1, further comprising the steps of:
   receiving an acknowledgement bitmap comprising one or more active bits; and
   retransmitting to the second remote host each segment in the plurality of segments corresponding to each bit in the one or more active bits of the acknowledgement bitmap.

6. The method of claim 1, further comprising the steps of:
   receiving an acknowledgement bitmap comprising one or more active bits;
   duplicating the acknowledgement bitmap as a retransmission bitmap;
   appending a retransmission header to each segment in the plurality of segments corresponding to the one or more active bits, wherein the retransmission header includes the retransmission bitmap; and
   retransmitting each segment in the plurality of segments to which a retransmission header was appended to the second remote host.

7. A method of congestion avoidance in a packet switched network comprising the steps of:
   receiving, in a transmit buffer of a sending daemon of a first remote host, a data stream to be transmitted over the network to a second remote host;

determining a retransmission window defined by a first unacknowledged sequence number in the data stream and a size;

determining a segment size that is smaller than the retransmission window size;

dividing the data stream in the retransmission window into a plurality of segments for transmission to the second remote host;

constructing a transmission bitmap comprising an active bit for each segment in the plurality of segments;

appending a header to each segment in the plurality of segments wherein the header includes the transmission bitmap;

transmitting each segment in the plurality of segments to the second remote host; and receiving an acknowledgement bitmap comprising an inactive bit corresponding to each segment in the transmission bitmap not received by the second remote host, and an active bit corresponding to each segment in the transmission bitmap received by the second remote host.

8. The method of claim 7, wherein the step of determining a segment size that is smaller than the retransmission window size further comprises determining a segment size by which the retransmission window size is divisible.

9. The method of claim 7, further comprising the steps of, wherein each bit in the acknowledgement bitmap is active:
determining that all segments in the retransmission window were acknowledged; and
sliding the retransmission window to the next contiguous unacknowledged sequence number in the data stream.

10. The method of claim 9, further comprising the steps of:
dividing the data stream in the retransmission window into a plurality of segments for transmission to the second remote host;
constructing a second transmission bitmap comprising an inactive bit for each segment in the plurality of segments;
appending a header to each segment in the plurality of segments wherein the header includes the second transmission bitmap;
transmitting each segment in the plurality of segments to the second remote host; and
receiving a second acknowledgement bitmap comprising an inactive bit corresponding to each segment in the second transmission bitmap not received by the second remote host, and an active bit corresponding to each segment in the second transmission bitmap received by the second remote host.

11. The method of claim 7, further comprising the step of, wherein the acknowledgement bitmap is comprised of one or more inactive bits: retransmitting to the second remote host each segment in the plurality of segments corresponding to each bit in the one or more inactive bits of the acknowledgement bitmap.

12. The method of claim 7, further comprising the steps of, wherein the acknowledgement bitmap is comprised of one or more inactive bits:
duplicating the acknowledgement bitmap as a retransmission bitmap;
appending a retransmission header to each segment in the plurality of segments corresponding to the one or more inactive bits, wherein the retransmission header includes the retransmission bitmap; and
retransmitting each segment in the plurality of segments to which a retransmission header was appended to the second remote host.

13. A method of congestion avoidance in a packet switched network comprising the steps of:
sending an acknowledgement from a receiving daemon of a first remote host to a second remote host, wherein the acknowledgement comprises:
a next expected sequence number; and
an advertised window size,
wherein the next expected sequence number and the advertised window size together define a plurality of segment positions in an advertised window;
receiving, in a receive buffer of the receiving daemon, a plurality of segments of a data stream wherein the number of segments therein is less than the number of segment positions of the advertised window;
sorting each segment in the plurality of segments into a sequentially corresponding segment position in the plurality of segment positions;
constructing an acknowledgement bitmap comprising a plurality of ordered binary bits, wherein each bit comprises a default value and a received value, and wherein each bit corresponds to a segment position in the plurality of segment positions;
setting each bit to a received value for each segment position corresponding to a segment in the plurality of segments;
appending the acknowledgement bitmap to a retransmission acknowledgement; and
transmitting the retransmission acknowledgement to the second remote host.

* * * * *